Sept. 5, 1939.    C. A. MENZEL    2,171,666
MEASURING DEVICE
Filed July 16, 1937    2 Sheets-Sheet 2
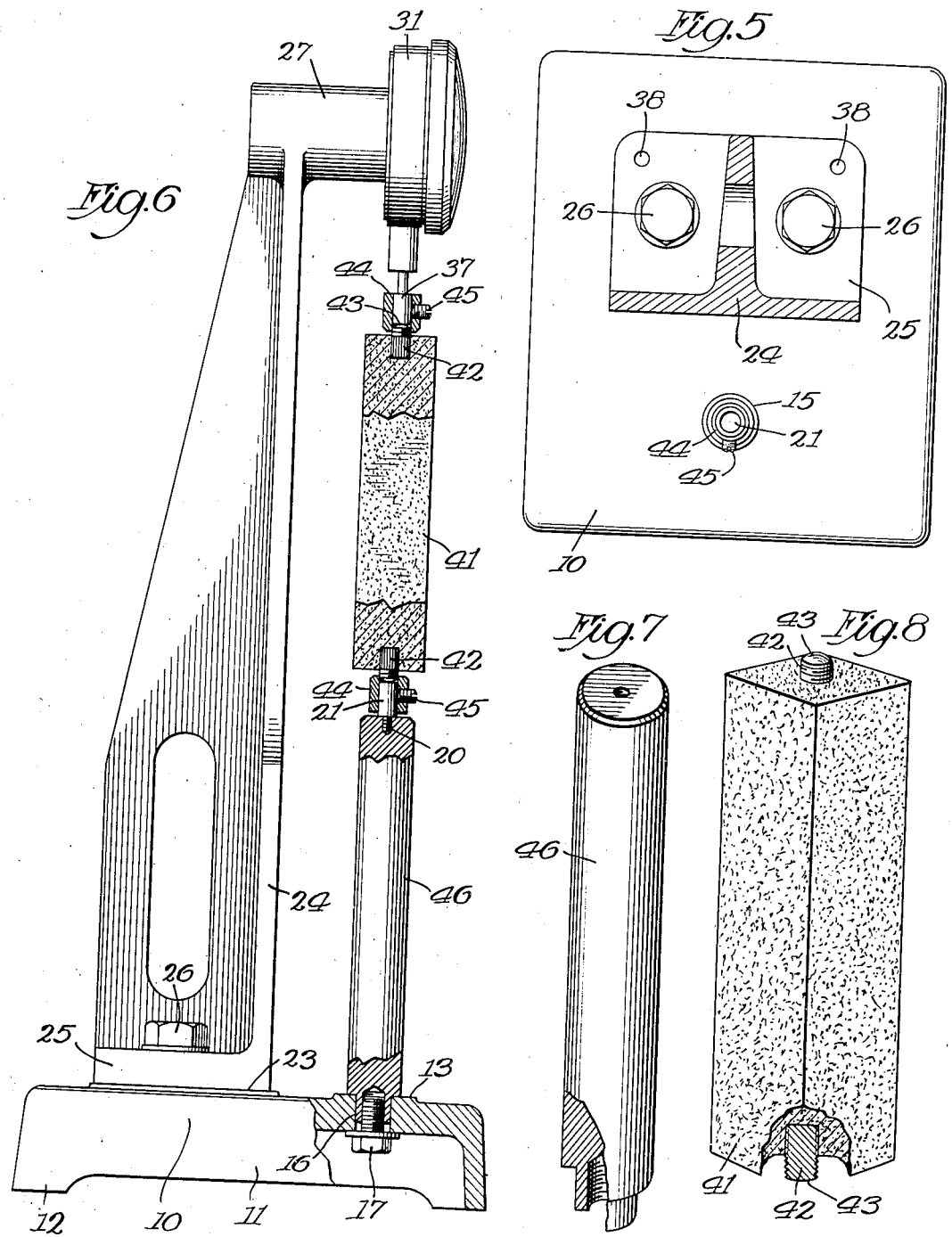
Inventor:
Carl A. Menzel
By Wilson, Mann & Cox
Attys Patented Sept. 5, 1939

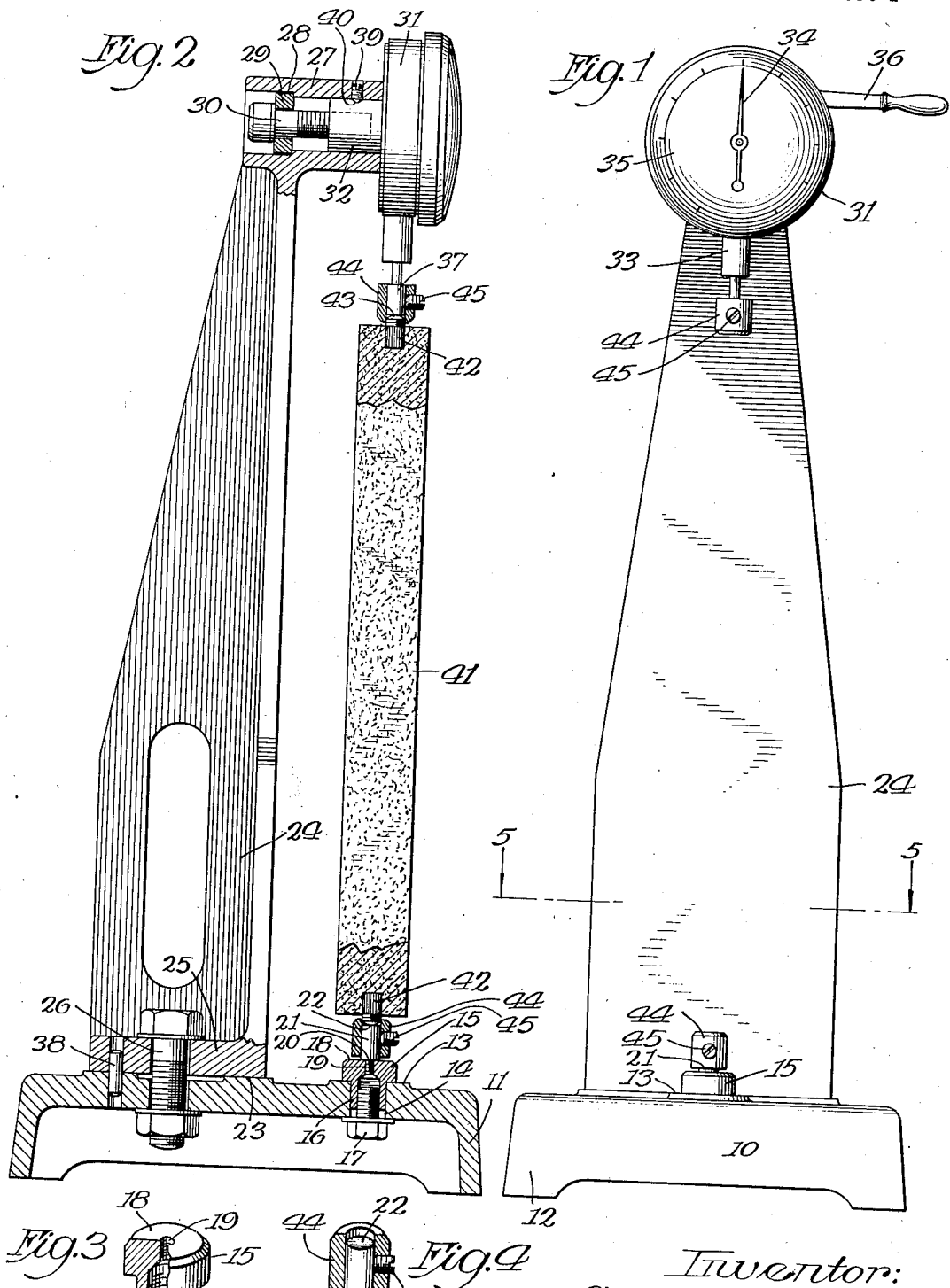

2,171,666

UNITED STATES PATENT OFFICE 2,171,666

MEASURING DEVICE

Carl A. Menzel, Homewood, Ill.

Application July 16, 1937, Serial No. 153,975

3 Claims. (Cl. 33—147)

The invention relates to measuring devices or comparators and has for its principal object to automatically center things to be measured between the anvils or measuring surfaces of the device.

Some Portland cement contains magnesium and calcium compounds that enlarge with age and when used as an ingredient in concrete causes the latter to expand with age. Instances are reported in which concrete bridge piers have grown as much as six inches. Aside from the fact that such change of dimensions is often intolerable in engineering construction, the enlargement or growth appears to be accompanied by breaking down of the concrete.

Chemical analysis cannot be relied upon to determine the presence or absence of unsound constituents in deleterious quantities in a particular lot of cement.

The growth which normally takes years can be produced artificially by putting the cement or concrete in a moist atmosphere at about 425° F. and 300 lbs. pressure for approximately five hours, at or 120 lbs. pressure and 350° F. for forty-eight to seventy-two hours.

By measuring test bars before and after this pressure cooking the presence of the undesirable ingredients can be learned with reasonable quickness.

This invention is particularly useful in measuring test bars of neat cement made in a mold that accurately locates a stainless steel measuring stud in each end of the bar and provided with a spherical surface.

Further objects and advantages of the invention will appear as the description is read in connection with the accompanying drawings in which Fig. 1 is a front elevation of the preferred form of a measuring device embodying the invention;

Fig. 2 is a vertical section through such a device showing a test bar of Portland cement;

Fig. 3 is a perspective view partly broken away of an anvil block for supporting the relatively stationary anvil;

Fig. 4 is a perspective view partly in section of one of the anvils and a sleeve for automatically centering the stainless steel pin on the anvil;

Fig. 5 is a transverse section on the line 5—5 of Fig. 1;

Fig. 6 is a view similar to Fig. 2, showing a device with a tall anvil block for use in measuring short test bars;

Fig. 7 is a perspective view of the tall anvil block;

Fig. 8 is a perspective view partly broken away of one of the test bars.

But these specific drawings and the corresponding description are used for the purpose of disclosure only and are not intended to impose unnecessary limitations on the claims.

The foundation of the instrument or apparatus is a cast iron base 10, strengthened at the edges by a down-turned flange 11, cut away at the bottom to provide what amount to feet 12, at the corners.

On its upper side the base has a finished seat 13 surrounding vertical bore 14 to receive an anvil block 15, having an internally threaded nipple 16 and secured in place by a bolt 17. The upper face 18 of the anvil block is finished and at the center it is drilled and tapped, as indicated at 19, to receive a reduced threaded portion 20 of the anvil 21, which has its upper face 22 finished at right angles to its axis.

The base also has another finished seat 23 for a standard 24 having a flange 25 secured to the base by bolts 26 passing through aligned openings in the flange and base. The standard is of generally T-shaped cross section, which makes it rigid with minimum weight and at its upper end is provided with a hollow head 27 countersunk at 28 to receive a ring 29 through which a bolt 30 is passed to secure a dial gauge 31. It has a threaded nipple 32 seated in the hollow head 27.

The dial gauge is of familiar construction and may be had upon the market. It will be sufficient to say that the gauge has suitable mechanism connecting a stem 33 with an indicator 34, rotating about a dial 35 and under the control of a lever 36 for manual operation.

A second anvil 37, similar to the anvil 21, is fixed to the stem 33, and is movable up and down with it, that movement being indicated in suitable units by the travel of the indicator 34 over the dial. A satisfactory form of gauge permits measurements to one-ten thousandths of an inch.

The anvils 21 and 37 are in exact alignment and are maintained in that position by dowel pins 38, driven through the flange 25 into the base 10, and a conically pointed screw 39, set into a countersunk hole 40 in the nipple 32 on the dial gauge 31.

The test bars 41 are fitted with stainless steel pins 42, each having an outer spherical surface 43, polished to bear against the face of the corresponding anvil. In order to center these in exact alignment with the anvils each of them is fitted with a sleeve 44, made fast by a set screw 45 and extending somewhat beyond the face of the corresponding anvil. The sleeves have an inside diameter closely approximating that of the measuring pins, and hence automatically center the pins with the anvil as they are brought into position.

In operation, when a bar is to be measured the upper anvil is raised by shifting the lever 36 manually, the lower pin is placed on the lower anvil and the upper pin brought substantially into position, when the upper anvil is gradually lowered until the pin enters the sleeve.

In ordinary practice the test bars will be measured at a selected temperature for moisture content prior to an aging treatment, and then again measured after the treatment at the selected temperature for moisture content to determine the change that has taken place.

The device shown in Fig. 2 is intended to measure specimens of considerable length, for instance, test bars ten inches long. In order to make the same device useable with shorter bars, say five inches in length, the anvil block 15 is replaced with an anvil block 46, constructed exactly like the anvil block 15, except that it is much taller.

Those skilled in the art will readily embody the gist of the invention in different forms to suit various purposes.

I claim:

1. In a device of the class described, relatively movable opposed anvils including one having a projecting cylindrical portion, means mounting said anvils in substantial alignment, a gauge having a stem operatively connected with one anvil for measuring said relative movement, a sleeve axially adjustable on the named anvil portion, and means making said sleeve fast on said portion with the sleeve projecting therefrom to form a substantially cylindrical socket for receiving and centering a complementally formed end of a test bar.

2. In a device for measuring cement or concrete test bars, the combination of a frame having a base adapted to seat on a floor or other support, a standard extending upwardly from said support, an anvil block having a reduced portion extending into an opening in said base, means for securing said reduced portion in said opening, a guage having a downwardly extending stem, mounted on said arm, an anvil on said stem in alignment with said stem, a sleeve adjustably mounted on said anvil and extending below the same to form a socket opening downwardly for receiving one complementary formed end of a test bar, an anvil secured to said block and extending upwardly therefrom, a sleeve detachably secured on said anvil and extending above the same to form a socket in vertical alignment with said first-named socket for receiving the other complementary formed end of a test bar, said block having an axial threaded opening therein for receiving a reduced threaded end of the adjacent anvil whereby said last named anvil may be removed and another of different length be substituted therefor.

3. In a device for measuring the elongation of cement or concrete test bars having aligned metal pins rigidly secured in and projecting from the ends of the bar, the combination of a supporting frame having a base adapted to rest on a floor or like support, a standard extending upwardly from said base, an anvil, a gauge having a stem operatively connected to said anvil and both carried by said arm with said stem extending downwardly therefrom, a cooperating anvil carried by said base and extending upwardly therefrom in vertical alignment with said first named anvil, a sleeve substantially surrounding and projecting from each anvil toward the other forming a socket on each anvil for receiving and centering said pins on said test bar.

CARL A. MENZEL.